United States Patent
Johnson

(10) Patent No.: US 8,364,570 B1
(45) Date of Patent: Jan. 29, 2013

(54) CERTIFICATE OF DEPOSIT CONSOLIDATION

(75) Inventor: David Adrian Johnson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/327,546

(22) Filed: Dec. 15, 2011

Related U.S. Application Data

(63) Continuation of application No. 12/100,675, filed on Apr. 10, 2008, now Pat. No. 8,099,349.

(51) Int. Cl.
*G06Q 40/00* (2012.01)
(52) U.S. Cl. .......................... 705/36 R; 705/35
(58) Field of Classification Search .................... 705/35, 705/36 R
See application file for complete search history.

(56) References Cited

U.S. PATENT DOCUMENTS

| | | | |
|---|---|---|---|
| 4,742,457 A | 5/1988 | Leon et al. | |
| 5,631,828 A | 5/1997 | Hagan | |
| 6,064,969 A | 5/2000 | Haskins | |
| 6,415,267 B1 | 7/2002 | Hagan | |
| 2003/0130916 A1 | 7/2003 | Block et al. | |
| 2005/0160019 A1* | 7/2005 | Cluse et al. | 705/35 |
| 2007/0143196 A1* | 6/2007 | Colvin | 705/35 |
| 2007/0233590 A1* | 10/2007 | Hardison, III | 705/36 R |
| 2007/0244777 A1 | 10/2007 | Torre et al. | |

OTHER PUBLICATIONS

Yoshitake, "Rollover October Investments: This is a big month for CDs to mature, but investors may want to look at other alternatives," Oct. 25, 1993, The Orange County Register, p. d 11.*
U.S. Appl. No. 12/100,675, filed Apr. 10, 2008, Johnson.
MOAA.org, "Financial Calculators," retrieved on Apr. 10, 2008 from the Internet: <http://www.moaa.org/usergroup/usergroup/_ad/serv_financial/serv_financial_insurance/serv_financial_tools_calculatorlist.htm>, 6 pages.
Egxcanada.com, "Rollover" (definition of), retrieved on Apr. 10, 2008 from the Internet: <http://www.egxcanada.com/info/GlossaryDefinition.asp?TermID=3082>, 1 page.
Bankrate.com, "Compare Interest Rates," retrieved on Apr. 10, 2008 from the Internet: http://www.bankrate.com/gookeyword/compare_rates_home.asp, Copyright 2008 Bankrate, Inc., 3 pages.
Yoshitake, "Rollover October Investments: This is a big month for CDs to mature, but investors may want to look at other alternatives," Oct. 25, 1993, The Orange County Register, p. d11, 3 pages.

* cited by examiner

*Primary Examiner* — Samica L Norman
(74) *Attorney, Agent, or Firm* — Kilpatrick Townsend & Stockton LLP

(57) ABSTRACT

A method of consolidating certificate of deposits includes providing a consolidation button for the certificate of deposits to a user on a computing device and receiving a user selection of the consolidation button. The method also includes scheduling one or more of the certificate of deposits for consolidation responsive to the user selection of the consolidation button.

20 Claims, 6 Drawing Sheets

CERTIFICATE OF DEPOSIT CONSOLIDATION

CROSS REFERENCES TO RELATED APPLICATIONS

This application is a continuation of U.S. patent application Ser. No. 12/100,675, filed on Apr. 10, 2008, now U.S. Pat. No. 8,099,349, the disclosure of which is hereby incorporated by reference in its entirety. This application is also related to U.S. patent application Ser. No. 12/100,684, U.S. patent application Ser. No. 12/100,693, U.S. patent application Ser. No. 12/100,701, and U.S. patent application Ser. No. 12/100,703, all of which are filed on Apr. 10, 2008 and now abandoned. The disclosure of these applications are hereby incorporated by reference in their entirety.

BACKGROUND OF THE INVENTION

A certificate of deposit (CD) is a time deposit, a financial product commonly offered to consumers by banks, thrift institutions, and credit unions. Such CDs are similar to savings accounts in that they are insured and thus virtually risk-free. A CD has a specific, fixed term (often three months, six months, or one to five years), and, usually, a fixed interest rate. It is intended that the CD be held until maturity, at which time the money may be withdrawn together with the accrued interest.

Commonly, institutions mail a notice to the CD holder shortly before the CD matures requesting directions. The notice usually offers the choice of withdrawing the principal and accumulated interest or "rolling it over" (depositing it into a new CD). Generally, a window is allowed after maturity where the CD holder can cash in the CD without penalty. In the absence of such directions, it is common for the institution to "roll over" the CD automatically, once again tying up the money for a period of time (though the CD holder may be able to specify at the time the CD is opened to not roll over the CD).

Some people have a lot of CDs at a lot of institutions. Managing the CDs may be complex and time consuming. Additionally, people may have difficulty determining what to do with a CD's proceeds when the CD matures.

SUMMARY OF THE INVENTION

A user may schedule certificates of deposit to be consolidated at maturity into an annuity, long term care insurance, or life insurance by an institution. A consolidation button or icon may be provided on a web page that is accessible to a user. The user may select the consolidation button or icon to schedule their CDs for consolidation.

In an implementation, a questionnaire may be provided to a user to determine whether the user is eligible for CD consolidation and to gather information pertaining to the user's CDs. A user may confer with a representative of the institution to ensure compliance and/or accuracy.

In an implementation, the user may provide information pertaining to their certificates of deposit, such as amount and maturity dates to the institution. In response, the institution may provide recommendations to the user regarding consolidation of the CDs by rolling them into annuities or insurance.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION OF THE INVENTION

Figure 1:
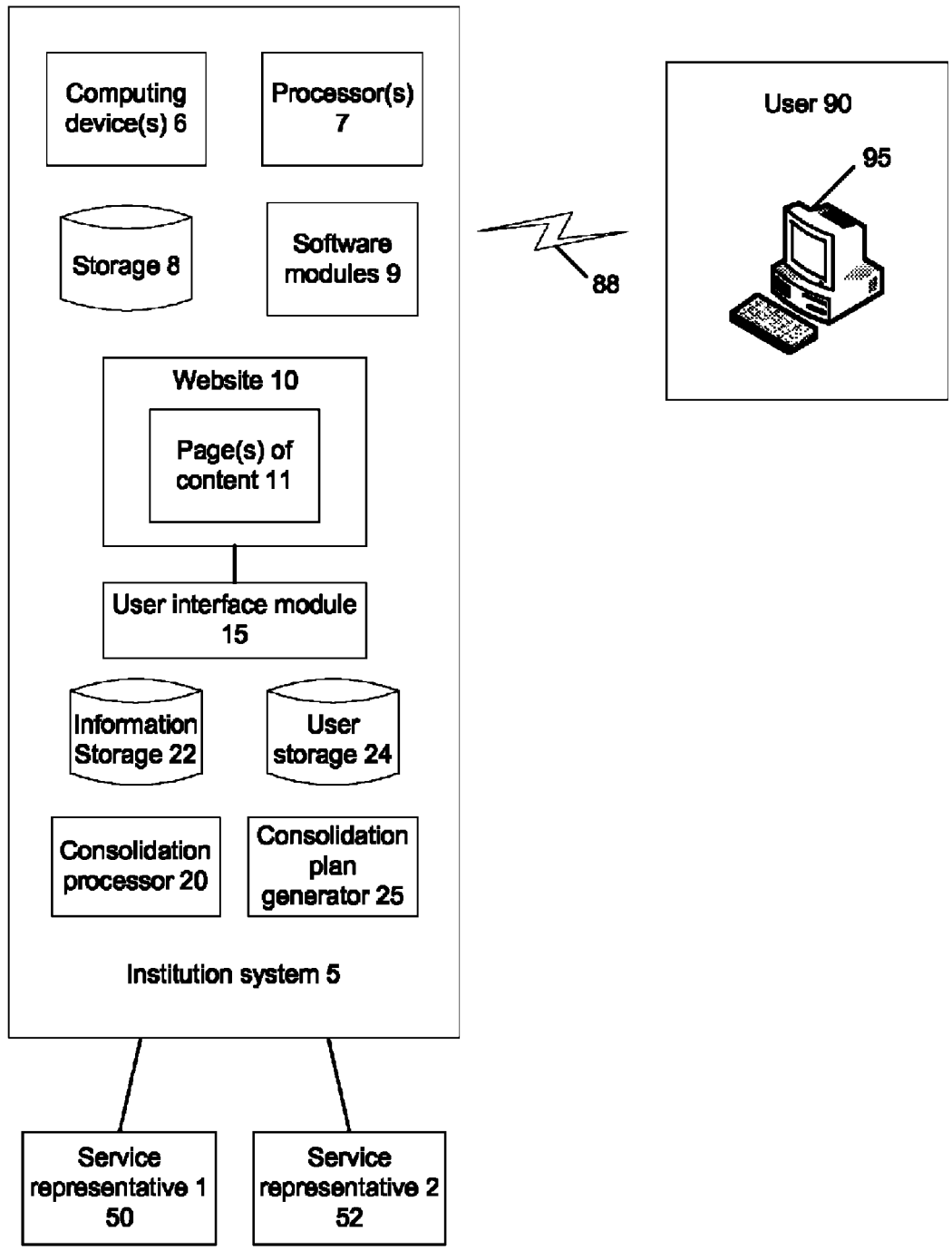
FIG. 1 is a block diagram of an implementation of a system that may be used to provide certificate of deposit consolidation.

FIG. 1 is a block diagram of an implementation of a system that may be used to provide certificate of deposit consolidation. By consolidation, it is meant that a user may schedule certificates of deposit to be consolidated or rolled over at maturity into an annuity, long term care insurance, or life insurance by an institution.

An institution system 5, associated with or otherwise maintained by an institution such as a financial services institution, may include a consolidation processor 20 that may process a request to consolidate one or more CDs from a user computing device 95 associated with a user 90. The consolidation processor 20 may retrieve information from storage, such as information storage 22 and user storage 24, and use the information in processing the request to consolidate the user's CDs. The consolidation processor 20 may also store information pertaining to the user's CDs in storage, such as information storage 22 and user storage 24.

A consolidation plan generator 25 may generate a CD consolidation plan pertaining to the user's CDs and provide the consolidation plan to the user 90 via the user computing device 95. The consolidation plan generator 25 may receive information from the user 90 via the user computing device 85, the consolidation processor 20, and from information storage 22 and user storage 24, for example.

The consolidation plan generator 25 may use tools, calculators, applications, and aggregators, for example to generate a consolidation plan. In an implementation, the consolidation plan generator 25 may include one or more of a portfolio planner, a financial assessment tool, a budget generating tool, an asset allocation tool, a life insurance determination calculator, a retirement advice generator, bank calculators, debt analyzers, retirement income planners, etc. The consolidation plan generator 25 may evaluate user information (e.g., the personal information and the financial information pertaining to the user) and consolidation plan that may comprise financial advice and/or recommendations for the user 85.

Information storage 22 may contain information pertaining to users who have accounts or products hosted by the institution system, for example. Information storage 22 may include data that may be used in the generation of a consolidation plan for the user's CDs and may be used to process CDs for consolidation. User storage 24 may contain information directed to users, such as name, address, marital status, account information, products owned, etc., for example.

The institution system 5 may generate and provide a questionnaire to the user 90 that requests information from the user 90 such as financial objectives, information pertaining to the user's CDs, other financial products owned by the user, current income, investments, risk tolerance, expenses, tax returns, insurance coverage, retirement programs, estate plans, and other pertinent information that may be used in the consolidation of the user's CDs and/or to generate a consolidation plan that meets the user's overall or specific financial agenda. The questionnaire may be pre-filled or personalized with data already known to the institution system 5 pertaining to the user 90, perhaps from existing accounts that the user has with the institution system 5. The institution system 5 may generate a consolidation plan based at least in part on the questionnaire.

Information directed to CDs and CD consolidation may be provided via a website 10 to the user computing device 95 associated with a user 90. For purposes of clarity and simplicity, an applicant for CD consolidation may be referred to herein as a "user." Thus, any reference to a user herein also includes any type of applicant, institution member or prospective member, or the like.

In an implementation, instead of hosting the website 10, the institution system 5 may comprise a conventional application server hosting a proprietary online service accessible only by a private network. In any event, the institution system 5 may have appropriate security mechanisms in place to prevent unauthorized third parties from intercepting the user's information.

The user 90 may provide data to the institution system 5 via the user computing device 95. The user computing device may be a handheld computing device such as a personal digital assistant (PDA) or a mobile phone, for example, or any type of personal computer (PC). The user computing device and the institution system 5 may be connected over a network 88. It is contemplated that the network 88 may be any type of private or public communication network such as, for example, an intranet, Internet, local area network (LAN), wide area network (WAN), wireless fidelity (WiFi) network, cellular connection, plain old telephone service (POTS), and the like. An example user computing device is described with respect to FIG. 6.

As described further herein, one of the service representatives 50, 52 associated with the institution system 5 may confer with a user 90 about CD consolidation. Such a conference may be via an Internet chat session or a telephone, for example. Although only two service representatives 50, 52 are shown in FIG. 1, it is contemplated that any number of service representatives may be associated with the institution system 5.

In an implementation, a user interface module 15 may receive content from the consolidation processor 20 or the consolidation plan generator 25 and format one or more pages of content 11 as a unified graphical presentation that may be provided to a user computing device 95. The page(s) of content 11 may be directed to CD consolidation information and may be provided to the user computing device 95 via the website 10 associated with the institution system 5. It will be appreciated that, in an embodiment, a service representative 50, 52 of the institution may access the user interface module 15, or the underlying CD consolidation information, to assist the user 90 with any questions the user may have and/or to confirm the compliance and accuracy of the information, for example.

When the user 90 accesses the website 10, using a web browser on the user computing device 95, they may be presented with financial services information such as CD information and/or CD consolidation information, via the page(s) of content 11. The information may be displayed on one or more web pages, further described with respect to FIG. 3, for example. The user 90 may enter information into the web pages via a web browser on the user computing device 95.

The content may be personalized to the user 90, using information retrieved from the user storage 24, for example. Personalization may include presentation of the page(s) of content 11 and/or functionality of the page(s) of content 11. For example, a graphical representation displayed on the page(s) of content 11 may be pre-filled with some information pertaining to the user, such as name, address, policy number, etc. In an implementation, personalization may be directed to CDs and/or other products that the user may own, and may provide specific information on the user's CDs and/or other products, such as amounts, maturity dates, etc., for example. Personalization is not limited to CD or CD consolidation and may be directed to any type of data, information, product, service, advertisement, etc.

As described further herein, in an implementation, the user 90 may select a consolidation button or icon presented on a web page. Selecting the consolidation button or icon allows the user to consolidate their CDs, if the user meets criteria established by the institution, for example. The user may be provided with one or more documents online, via the website 10 or via email for example, that they can electronically sign. Any known electronic signature technique may be may used. The user 90 may electronically sign the one or more documents and provide them electronically to the institution system 5, via email or the website 10 for example.

A user access system may be implemented as a web server in an implementation. The user access system, through the use of any suitable interactive web technology, provides an interactive experience to the user 90 through which access to and maintenance of their financial advice, recommendations, and/or financial plan such as a CD consolidation plan can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

In an implementation, the institution may be a financial services institution having a financial services website. On the website, in a common space, the user may be presented with financial advice, recommendations, and/or a financial plan such as a CD consolidation plan.

The institution system 5 may comprise one or more computing devices 6. The user computing device 95 may allow the user 90 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein.

Information associated with the user, products, and/or services, may be stored in storage 8 or other storage, for example.

Example software modules may include modules for sending and receiving information between the institution system 5 and the user 90, requesting and retrieving information from storage 8, information storage 22, and user storage 24, processing CD consolidation requests, and generating web pages, described further herein. While specific functionality is described herein as occurring with respect to specific modules, the functionality may likewise be performed by more, fewer, or other modules. The functionality may be distributed among more than one module. An example computing device and its components are described in more detail with respect to FIG. 6.

Figure 2:
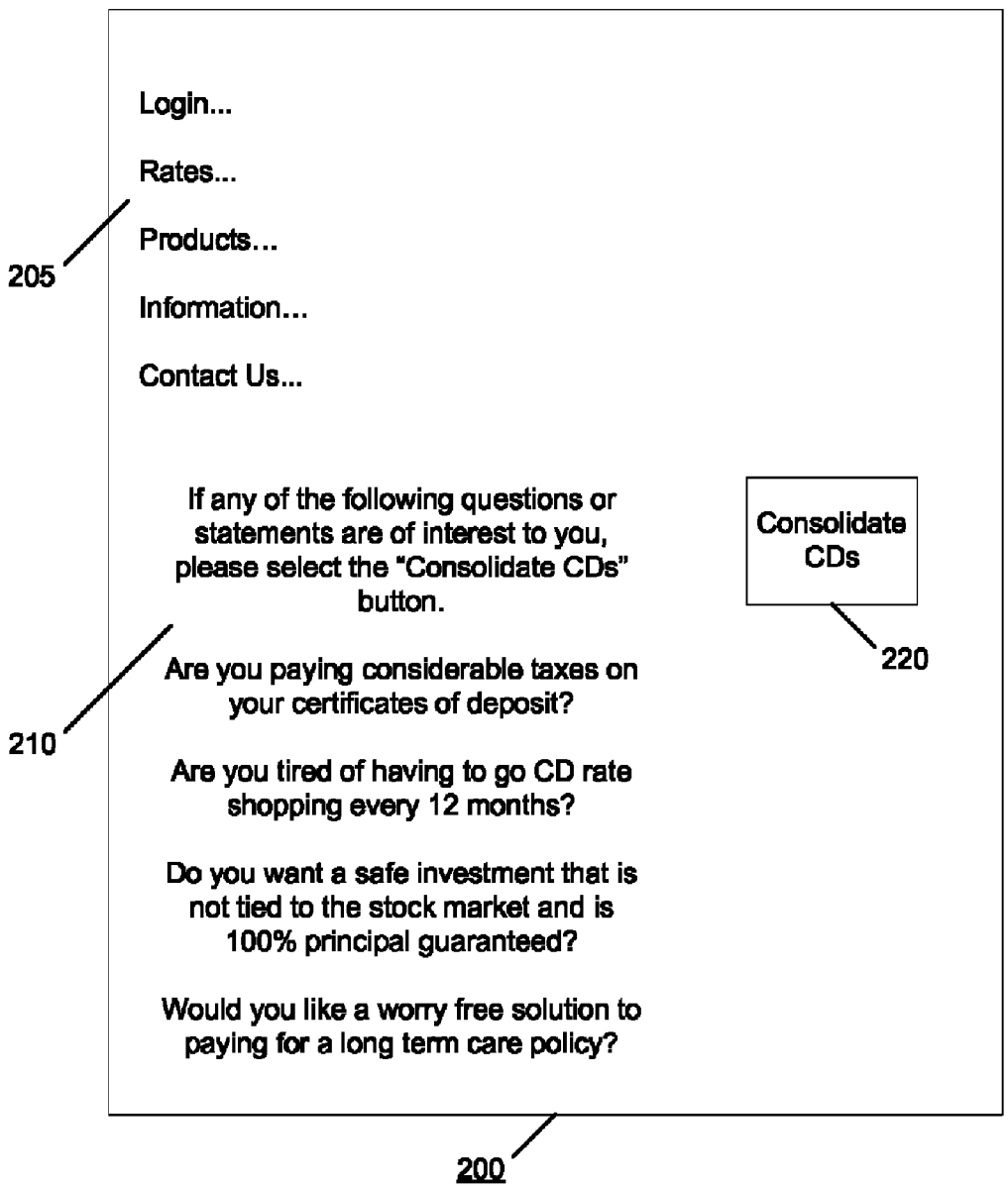
FIG. 2 is an implementation of an example screen shot that may be provided to a user for certificate of deposit consolidation.

FIG. 2 is an implementation of an example screen shot 200 that may be provided to a user for certificate of deposit consolidation. The screen shot 200 may be of a web page that is provided to the user via a financial services institution or a financial services website, for example.

The screen shot 200 may comprise a common area 205 that may include items such as login information and prompts and contact information. The common area 205 may include data pertaining to products, rates, and other information provided by, or available through, the financial services institution, for example. Such a common area 205 is optional and may comprise any information or data. The information and data presented in FIG. 2 are examples only.

A CD area 210 may be provided on the screen shot 200 that is directed to CDs and may be informational and/or contain promotional material about CDs and CD consolidation. A consolidation button or icon 220 may be provided on the screen shot 200. The consolidation button or icon 220 may be selected by a user. Selecting the consolidation button or icon 220 allows the user to consolidate their CDs at maturity into an annuity, long term care insurance, or life insurance, for example, as described further herein. A user may select the consolidation button or icon 220 by highlighting it and/or clicking on it for example.

It is contemplated that the consolidation button or icon 220 may be provided and displayed on multiple web pages of a website. In an implementation, the consolidation button or icon 220 is only displayed for certain users, based on criteria pertaining to each user, for example. Example criteria may be based on whether the user already has an annuity, long term care insurance, and/or life insurance, or whether the user has a certain amount of debt, etc. After a user logs in to the institution system, or a website associated with the institution system, for example, the consolidation processor 20 in FIG. 1, for example, may assist in determining whether or not the consolidation button or icon 220 is to be displayed for a certain user, based on information pertaining to the user. The information pertaining to the user may be retrieved from storage and/or provided by the user, e.g., in response to questions provided by the institution system.

In another implementation, the consolidation button or icon 220 may be displayed to all users. It may then be determined, after the user has selected the consolidation button or icon 220, whether or not CD consolidation is appropriate for that user. Such a determination may be made by the consolidation processor 20 and/or a service representative 50, 52, for example, in conjunction with information pertaining to the user. The example information, data, and items shown in FIG. 2 are examples only and are not intended to be limiting.

Figure 3:
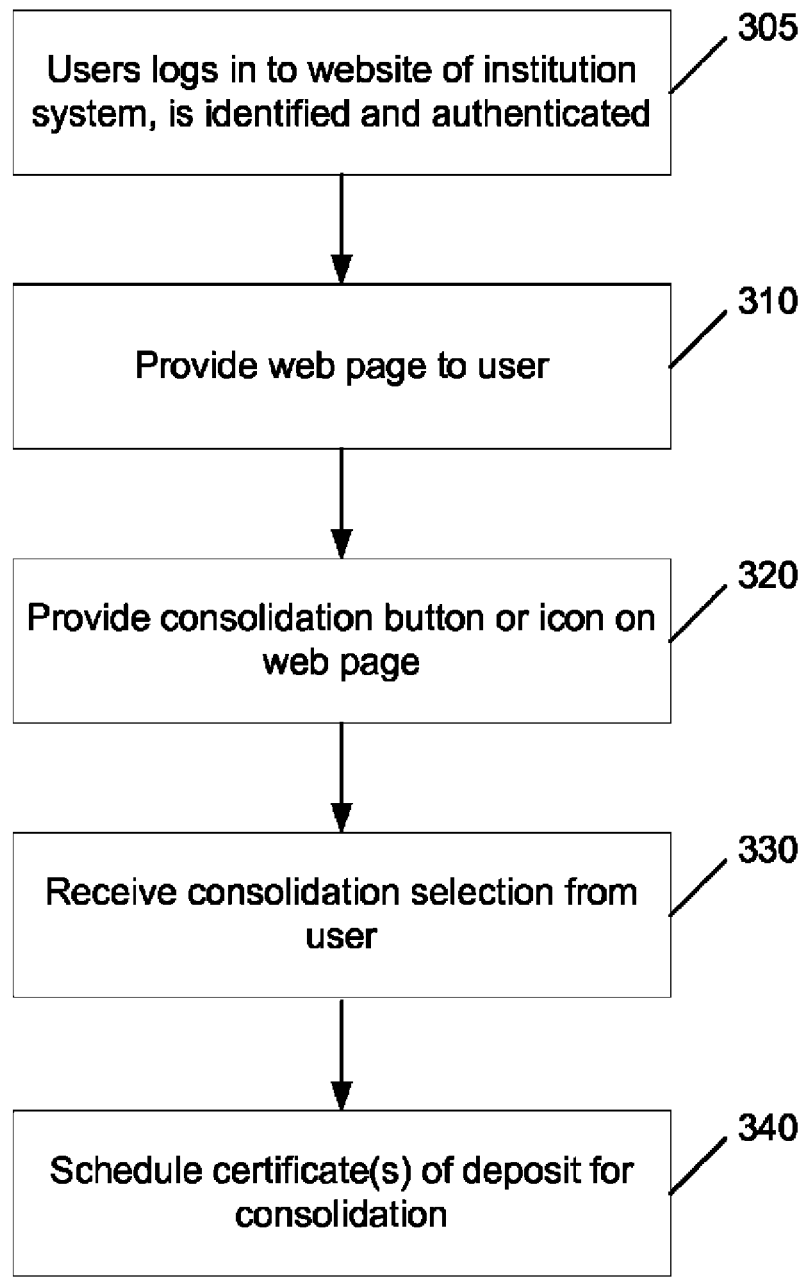
FIG. 3 is an operational flow of an implementation of a method that may be used to provide certificate of deposit consolidation.

FIG. 3 is an operational flow of an implementation of a method 300 that may be used to provide certificate of deposit consolidation. At operation 305, a user may log into a website associated with the institution system and may be identified and authenticated using any known techniques. A web page may then be provided to the user at operation 310. An example screen shot of such a web page is described with respect to FIG. 2.

Assuming that a consolidation button or icon is to be displayed on the web page (e.g., based on criteria pertaining to the user, displayed to all users, etc.), the consolidation button or icon is displayed at operation 320. The user may then select the consolidation button or icon at operation 330. Such a selection may take the form of highlighting the button or icon, clicking on the button or icon, or any other known form of selection. At operation 340, the user's CDs may be scheduled for consolidation, examples of which are described further herein.

Figure 4:
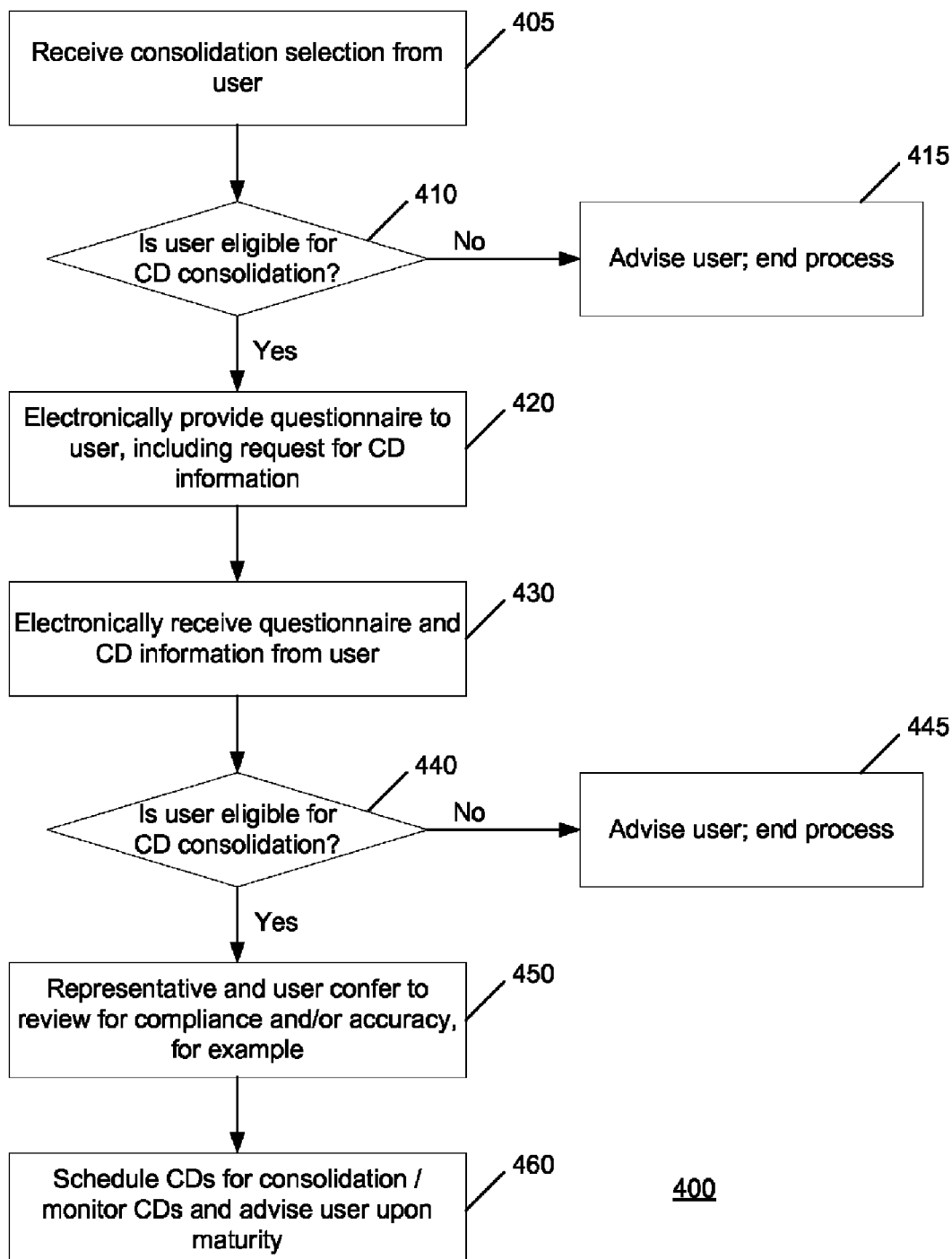
FIG. 4 is an operational flow of another implementation of a method that may be used to provide certificate of deposit consolidation.

FIG. 4 is an operational flow of another implementation of a method 400 that may be used to provide certificate of deposit consolidation. After being presented with a consolidation button or icon, the user may choose to consolidate their CDs by selecting the consolidation button or icon at operation 405.

In an implementation, at operation 410, it may be determined whether the user is eligible for CD consolidation. For example, the institution system may receive information pertaining to the user's personal and financial situations from storage and/or from the user, and based on this information determine whether the user is eligible for CD consolidation. A CD may be consolidated into an annuity (e.g., an immediate annuity, a fixed annuity, or a variable annuity), long term care insurance, and/or life insurance by rolling the proceeds of a matured CD into the purchase of an annuity or insurance, for example. In an implementation, if the user already has these products, then the system may determine that the user is not eligible for CD consolidation. Alternatively or additionally, if the user has a certain amount of debt, or meets other predetermined personal and/or financial criteria, the system may determine that the user is not eligible for CD consolidation.

If it is determined that the user is not eligible for CD consolidation, the user may be notified via the website or email, for example, and/or a service representative may contact the user, at operation 415.

If the user is eligible for CD consolidation as determined at operation 410, or if operation 410 is not implemented (as it may be optional), processing continues at operation 20. A questionnaire may be provided to the user at operation 420. The questionnaire may request information from the user that may be analyzed and used to further determine whether the user is eligible for CD consolidation (e.g., the questionnaire may ask questions to determine if the user has adequate emergency funds, etc.), may be used to schedule CDs for consolidation into certain products upon maturity, may be used to docket maturity dates into a calendaring system so that the user may be advised when each CD is about to mature (e.g., 2 months priority to maturity, 1 month prior to maturity, 10 days prior to maturity, etc.) or has matured (on the day of maturity or shortly thereafter), etc. Prior to providing the questionnaire to the user, the questionnaire may be pre-filled or personalized with financial and/or personal data that is known to the institution system about the user, such as the user's name and known CDs for example. This information may be retrieved from storage associated with the institution system.

The questionnaire may be electronically provided to the user via the website or email, for example. The user may then fill out the questionnaire, responding to any questions or requests for information contained in the questionnaire, and electronically provide the filled out questionnaire back to the institution system, at operation 430. The user may provide responses to the questionnaire that contain information about the user's CDs, such as the CD account number, name of the financial institution that issued the CD, routing (ABA) number, and date of maturity. The user may provide the questionnaire via the website, email, or any other electronic means.

In an implementation, at operation 440, it may be determined whether the user is still eligible for CD consolidation. This operation may be similar to operation 410, and may be based on the information in the user's response to the questionnaire. If it is determined that the user is not eligible for CD consolidation (e.g., the user does not have adequate emergency funds, etc.), the user may be notified via the website or email, for example, and/or a service representative may contact the user, at operation 445.

In an implementation, if the user is eligible for CD consolidation as determined at operation 440, or if operation 440 is not implemented (as it may be optional), processing continues at operation 450. At operation 450, the user and a service representative may confer to discuss the CD consolidation, to provide a confirmation number, to confirm accuracy of the CDs and their related information, and to ensure compliance with any applicable disclosure laws, for example. Such a conference may take place by telephone or via an Internet chat session, for example, and may be initiated by the user or the service representative. It is contemplated that such a conference may be optional.

At operation 460, CDs may be scheduled for consolidation and/or CDs may be monitored for maturity. Regarding consolidation, the CDs may, upon maturity, be scheduled to roll over or otherwise have their assets transferred into a previously selected annuity, such as an immediate annuity, a fixed annuity, or a variable annuity, or an insurance policy, such as long term care insurance or single premium life insurance.

CDs may also be monitored by the institution system and as they reach maturity, the user may be advised or reminded that the CDs are reaching maturity or have matured. The institution system may send such an advisory or reminder by email, telephone, or other means, for example. The institution system may also provide one or more recommendations or options to the user for rolling over or otherwise transferring the assets from the maturing CD. The recommendations or options may include purchasing one or more annuities and/or types of insurance. The recommendations or options may contain general information and/or may be tailored to the user based on the personal and financial information pertaining to the user.

Figure 5:
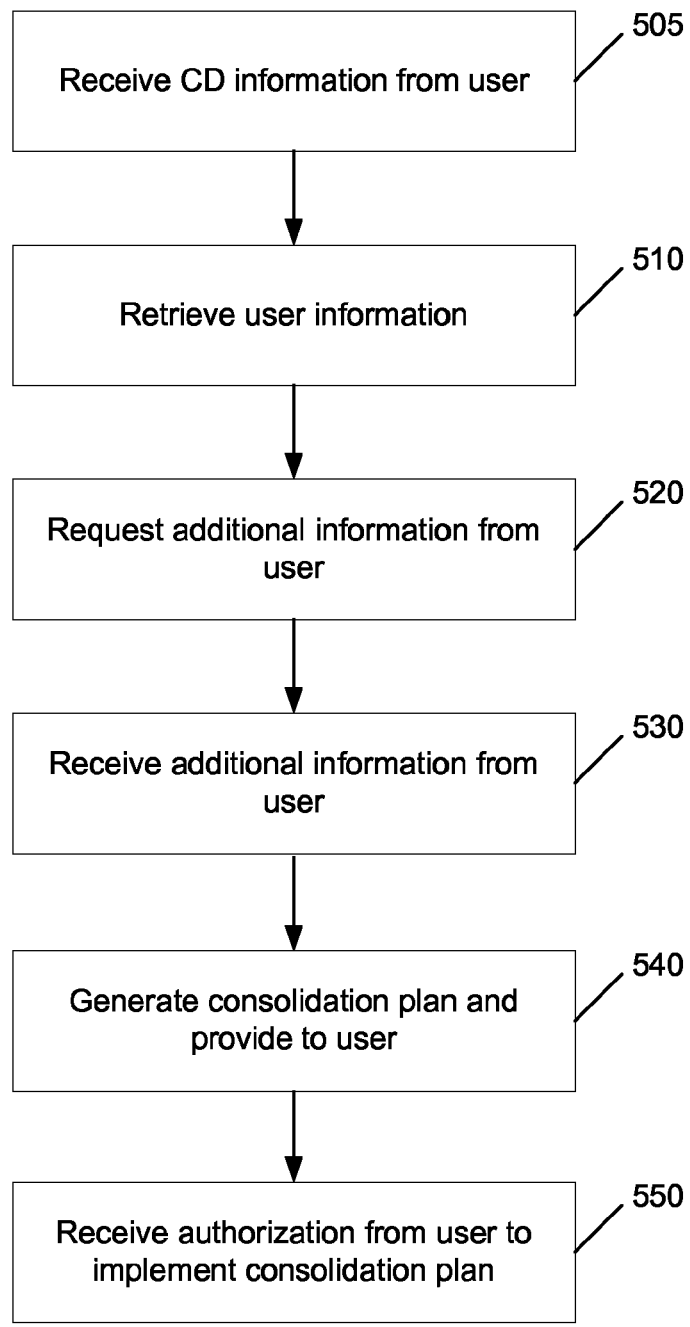
FIG. 5 is an operational flow of another implementation of a method that may be used to provide certificate of deposit consolidation.

FIG. 5 is an operational flow of another implementation of a method 500 that may be used to provide certificate of deposit consolidation. At operation 505, the user provides CD information to the institution system, such as the amount, account number, maturity date, institution that issued the CD, and the routing (ABA) number, for each CD.

At operation 510, the institution system retrieves user information from storage. The user information may comprise personal information and/or financial information. The institution system may request additional information from the user at operation 520. Such additional information may be personal and/or financial information that the institution system does not have in storage and that may be useful to the consolidation plan generator in the generation of a consolidation plan. At operation 530, the user may provide the additional information to the institution system. The additional information may be used by the consolidation plan generator in conjunction with the retrieved user information to generate a consolidation plan at operation 540.

A consolidation plan may contain information, recommendations, advice, and/or reminders, for example, regarding consolidating or rolling over some or ail of the user's CDs as they mature. Consolidation or roll over may take the form of using the assets of the CD when mature to purchase one or more annuities and/or one or more types of insurance. A consolidation plan may provide recommendations as to how much insurance the user should consider purchasing and what type of annuities the user should consider purchasing. The consolidation plan may then be provided to the user, via a website or email, for example.

The user may review the consolidation plan and sign an authorization form to authorize the financial institution to proceeds with the consolidation plan. The authorization form may be presented to the user via a website, email, facsimile, etc. In an implementation, the user may electronically sign the authorization form using any known electronic signature technique. The user may send the signed authorization form to the institution system where it is received at operation 550. The institution system may then implement the consolidation plan, e.g., by sending a transfer form, at maturity, to the institution that issued a CD with instructions to forward the account to the institution system.

Exemplary Computing Arrangement

Figure 6:
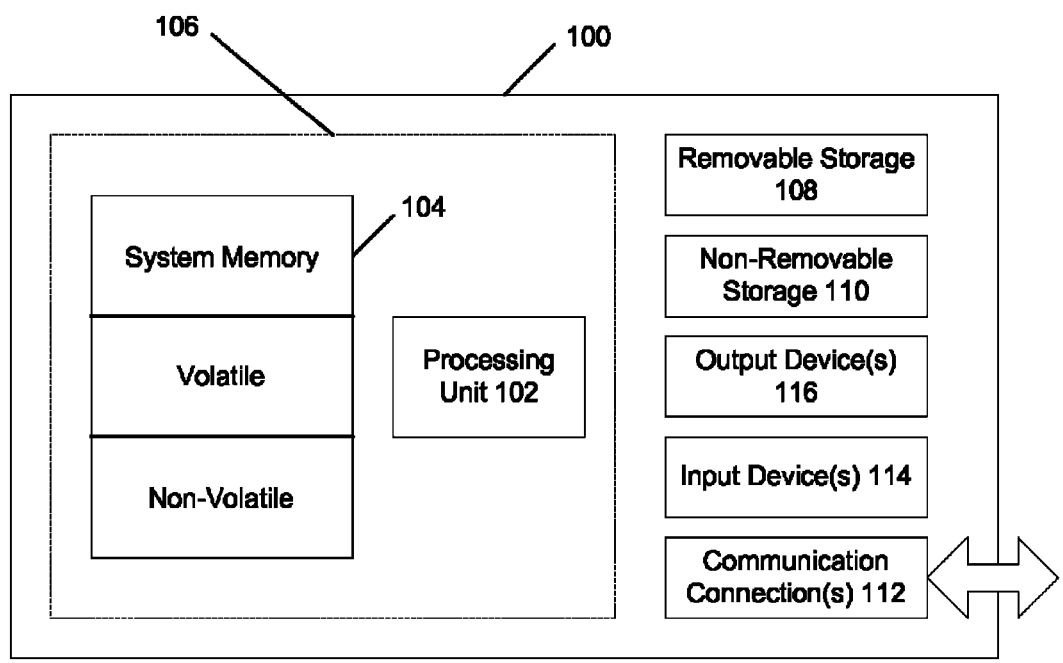
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 6 by dashed line 106.

Computing device 100 may have additional features and/or functionality. For example, computing device 100 may include additional storage (removable and/or nonremovable) including, but not limited to, magnetic or optical disks or tape. Such additional storage is illustrated in FIG. 6 by removable storage 108 and non-removable storage 110.

Computing device 100 typically includes a variety of computer-readable media. Computer-readable media can be any available media that can be accessed by computing device 100 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 104, removable storage 108, and non-removable storage 110 are ail examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as a keyboard, mouse, pen, voice input device, touch input device, etc. Output device(s) 116 such as a display, speakers, printer, etc. may also be included. Ali these devices are well known in the art and need not be discussed at length here.

Computing device 100 may be one of a plurality of computing devices 100 inter-connected by a network. As may be appreciated, the network may be any appropriate network, each computing device 100 may be connected thereto by way of communication connection(s) 112 in any appropriate manner, and each computing device 100 may communicate with one or more of the other computing devices 100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of consolidating certificate of deposits, the method comprising:
   providing a processor;
   providing a consolidation button for the certificate of deposits to a user on a computing device;
   receiving a user selection of the consolidation button; and
   scheduling, using the processor, one or more of the certificate of deposits for consolidation responsive to the user selection of the consolidation button.

2. The method of claim 1 wherein the consolidation button comprises a consolidation icon displayed on the computing device.

3. The method of claim 1 wherein providing the consolidation button and receiving the user selection are performed via a website.

4. The method of claim 1 wherein the consolidation of the certificate of deposits include consolidating the one or more of the certificate of deposits, each certificate of deposit having a different maturity date, into one or more recommended financial service products.

5. The method of claim 1 wherein the consolidation of the certificate of deposits include rolling the certificates of deposits, at maturity, into an annuity or an insurance product.

6. The method of claim 1 further comprising determining that the user is eligible for consolidating the certificate of deposits prior to the consolidation.

7. The method of claim 1 further comprising comparing the user's personal or financial situation to predetermined personal or financial criteria to determine if the user is eligible for consolidation of the certificate of deposits.

8. A non-transitory computer-readable medium comprising computer-readable instructions for consolidating certificate of deposits, the computer-readable instructions being executed by a computer having a processor and comprising instructions to:

provide a consolidation button for the certificate of deposits to a computing device;

receive a user selection of the consolidation button; and schedule one or more of the certificate of deposits for consolidation responsive to the user selection of the consolidation button.

9. The non-transitory computer-readable medium of claim 8 wherein the consolidation button comprises a consolidation icon displayed on the computing device.

10. The non-transitory computer-readable medium of claim 8 wherein providing the consolidation button and receiving the user selection are performed via a website.

11. The non-transitory computer-readable medium of claim 8 wherein the consolidation of the certificate of deposits include consolidating the one or more of the certificate of deposits, each certificate of deposit having a different maturity date, into one or more recommended financial service products.

12. The non-transitory computer-readable medium of claim 8 wherein the consolidation of the certificate of deposits include rolling the certificates of deposits, at maturity, into an annuity or an insurance product.

13. The non-transitory computer-readable medium of claim 8 further comprising instructions to determine that the user is eligible for consolidating the certificate of deposits prior to the consolidation.

14. The non-transitory computer-readable medium of claim 13 further comprising instructions to compare the user's personal or financial situation to predetermined personal or financial criteria to determine if the user is eligible for consolidation of the certificate of deposits.

15. A system for consolidating certificate of deposits, the system comprising:

a processor; and a computer-readable medium coupled to the processor and storing a plurality of instructions, which, when executed, cause the processor to consolidate the certificate of deposits, the plurality of instructions comprising:

instructions that cause the processor to provide a consolidation button for the certificate of deposits on a computing device;

instructions to receive a user selection of the consolidation button; and instructions to schedule one or more of the certificate of deposits for consolidation responsive to the user selection of the consolidation button.

16. The system of claim 15 wherein the consolidation button comprises a consolidation icon displayed on the computing device.

17. The system of claim 15 wherein providing the consolidation button and receiving the user selection are performed via a website.

18. The system of claim 15 wherein the consolidation of the certificate of deposits include consolidating the one or more of the certificate of deposits, each certificate of deposit having a different maturity date, into one or more recommended financial service products.

19. The system of claim 15 wherein the consolidation of the certificate of deposits include rolling the certificates of deposits, at maturity, into an annuity or an insurance product.

20. The system of claim 15 further comprising instructions to determine that the user is eligible for consolidating the certificate of deposits prior to the consolidation.

\* \* \* \* \*